United States Patent

Merlo

[11] Patent Number: 6,109,815
[45] Date of Patent: Aug. 29, 2000

[54] JOINT MECHANISM

[76] Inventor: Werner O. Merlo, 51203 Range Road 265, Spruce Grove, Alberta, Canada, T7Y 1E7

[21] Appl. No.: 09/068,003

[22] PCT Filed: Nov. 3, 1995

[86] PCT No.: PCT/EP95/04311

§ 371 Date: Aug. 28, 1998

§ 102(e) Date: Aug. 28, 1998

[87] PCT Pub. No.: WO97/17548

PCT Pub. Date: May 15, 1997

[51] Int. Cl.[7] ................................................ F16C 11/06
[52] U.S. Cl. .......................... 403/90; 403/103; 403/84; 403/124
[58] Field of Search .................... 403/90, 83, 84, 403/92, 93, 97, 103, 124, 128, 122, 125; 135/21

[56] References Cited

U.S. PATENT DOCUMENTS

| 892,105 | 6/1908 | White . |
| 3,433,510 | 3/1969 | Hulterstrom . |
| 3,535,976 | 10/1970 | Osuga . |
| 3,691,788 | 9/1972 | Mazziotti . |
| 3,841,769 | 10/1974 | Bowerman . |
| 4,620,813 | 11/1986 | Lacher . |
| 4,674,523 | 6/1987 | Glatz ................................. 403/125 |
| 5,002,081 | 3/1991 | Stromeyer . |
| 5,098,432 | 3/1992 | Wagenknecht ....................... 403/90 |
| 5,280,871 | 1/1994 | Chuang . |
| 5,588,767 | 12/1996 | Merlo ................................. 403/128 |
| 5,897,417 | 4/1999 | Grey ................................. 403/90 X |

FOREIGN PATENT DOCUMENTS

| 1023077 | 3/1953 | France . |
| 8423446 | 8/1984 | Germany . |
| 291547 | 6/1928 | United Kingdom . |

*Primary Examiner*—Terry Lee Melius
*Assistant Examiner*—David E. Bochna
*Attorney, Agent, or Firm*—Whitham, Curtis & Whitham

[57] ABSTRACT

In an angularly adjustable, releasably lockable ball joint, the ball has a surface covered with polygonal patterns of spaced apart protuberances, the protuberances define concavities. An actuator tip is provided to penetrate at least one concavity and simultaneously contact the protuberances if the pattern to lock the ball and actuator together, thereby fixing the orientation of shanks attached to the ball and actuator.

6 Claims, 6 Drawing Sheets

JOINT MECHANISM

BACKGROUND OF THE INVENTION

1. Field of the Invention

The invention refers to an angularly adjustable, releasably lockable joint mechanism for rigidly joining first and second parts at a selected orientation, said mechanism comprise a rounded member having a plurality of concavities on its surface and being secured to the first part, a disengageable actuator having at least one tip and being operative to advance the tip to lock up with the rounded member by penetrating at least one concavity or to retract the tip to disengage it from the rounded member, said actuator being connected with the second part, and means for holding the parts, rounded member and actuator together, said means being motive to allow the parts to change relative orientation when the actuator tip is retracted.

This mechanism is particularly adapted for use with angularly adjustable, locking devices subject to high torsional forces.

2. Background Description

The present invention generally relates to an angularly adjustable releasably lockable joint mechanism for rigidly joining first and second parts at a selected orientation, and more particularly to an angularly adjustable releasably lockable joint mechanism having a plurality of patterned protuberances forming concavities so that a tip of actuator can engage and disengage therefrom.

Such a joint mechanism is disclosed for example in U.S. Pat. No. 5,280,871. A movable rod has a ball fixed at its bottom, and the ball is provided with a plurality of holes orderly and equally spaced apart in the surface for the functional end of a locating pin of a supporter to selectably engage one of them to keep the movable rod secured in an angle needed. Such a dimpled ball and an actuator having a spherical tip are also shown in U.S. Pat. No. 3,433,510. U.S. Pat. Nos. 3,841,769 and 4,620,813 show a socket having protuberances and a ball having dimples or indentations which engage to fix the orientation of the arms attached thereto. U.S. Pat. No. 3,691,788 shows a ball having a grooved surface and an actuator having a spherical tip which locks up by engaging a groove. U.S. Pat. No. 892,105 shows a ball and socket whose surfaces are both knurled.

Angularly adjustable, releasably lockable ball joints are commonly used as part of an umbrella assembly, to hold a suspended canopy locked at an angle to horizontal. Assemblies of this type are shown in U.S. Pat. No. 4,674,523 and U.S. Pat. No. 5,002,081. In general, these prior art ball joints involve:

- a ball attached to a shank forming part of the suspension stand;
- an actuator or screw spindle carrying the canopy;
- a housing engaging the ball and spindle so that they cannot separate, but which is operative to enable the spindle to be angularly adjusted when the actuator is disengaged; and
- a concave socket or pin at the end of the spindle, for frictionally engaging the ball to lock the spindle and ball together and fix the canopy at a desired angle.

The frictional engagement of ball and socket as well as a dimpled ball and spherical pin actuator have been found to be insufficient when subjected to high torsional forces.

SUMMERY OF THE INVENTION

One objective of the invention is therefore to modify the joint mechanism described above to provide a stronger locking action between the actuator and the rounded member.

In combination with the features of the joint mechanism described above, the invention is characterized in that

- the rounded member having a plurality of patterns of spaced-apart protuberances cornering at least part of its surface, the protuberances of each pattern forming a concavity therebetween;
- the patterns, and protuberances being mainly consistent in shape, area and size, the effective patterns having a regular polygonal conjuration;
- the protuberances, actuator tip and pattern being dimensioned so that the tip can penetrate the concavity of each pattern and simultaneously contacts all of the protuberances of the pattern that it penetrates but remains spaced from the bottom of the concavity at full penetration, whereby the tip and pattern of protuberances lock together.

The invention has the following advantages:

- the locking capability is greater than one obtains with a dimpled ball;
- by arranging the patterns in accordance with a geometric designs the longitude and latitude of the concavity sites is predictable;
- the use of the triangular pattern yields a large number of concavity sites in the case of a rounded member that is spherical and of given diameter. Compared to an equivalent pattern of dimples, twice as many concavity sites result simply through the formation of the protuberances in place of the dimples; and
- it is possible to address and achieve locking at each individual position by electronic means, since all of the concavity sites or locking positions are mathematically definable.

The rounded member may be spherical and could be defined by a ball.

The invention comprises patterns of three and four protuberances as well as any polygons of more than four protuberances. But complete locking could also be achieved between just two protuberances and one actuator: In this case the rounded member is defined by two smooth semi-spherical halves joined in the middle by a narrow sometimes recessed surface in the middle. This recessed surface is fitted with continuous half round protuberances extending between the skeui-spherical halves along its surface and the whole unit is contained in a suitable shell structure. Here it would take only two protuberances and one incoming suitable actuator to ensure locking. The same would also apply to a gear-like structure contained in a suitable shell and locked by an actuator.

According to the invention, the penetrating tip of the actuator contacts the surfaces of the protuberances defining the penetrated concavity, but does not contact the surface of the rounded member defining the bottom of the concavity. But after extended use, the protuberances may show significant wear, allowing the actuator tip to touch said surface. To prevent such an incomplete locking, it may be useful to add a depression into the surface of the rounded member at each locking site which would in conjunction with the protuberances result in a kind of sine wave surface. This could prolong the use of the joint mechanism before the actuator tip touches the bottom of the concavity.

The configuration of protuberances preferably form triangular or square patterns, or the protuberances could define a combination of square and triangular patterns on said rounded member.

The actuator may have multiple tips disposed to penetrate simultaneously more than one concavity. Furthermore, the actuator or its head defined by the tip may have a floating seating to enable self-adjustment.

In a preferred version, the, actuator can be biased, such as by spring loading, such that the actuator tip is prevented from falling out of contact with the protuberance or cluster of protuberances, when the actuator is not in the locking position.

It is also within the invention to use an actuator, the configuration of this actuator being similar to that of the rounded member including the protuberances.

The joint mechanism according to the invention will find application in different fields, for example in the field of prosthetics (defining an orthotic or prosthetic joint), wheelchairs (head rest-joint) and for example in connection with a sunshade umbrella.

BRIEF DESCRIPTION OF THE DRAWINGS

Further characteristics and advantages of the invention will become apparent from the detailed description of an embodiment thereof, illustrated only by way of non-limitative example in the accompanying drawings, wherein FIG. 1—is a perspective, partly sectional view showing a rounded member defined by a ball, an actuator and connection housing assembled.

DETAILED DESCRIPTION OF A PREFERRED EMBODIMENT OF THE INVENTION

Figure 1:
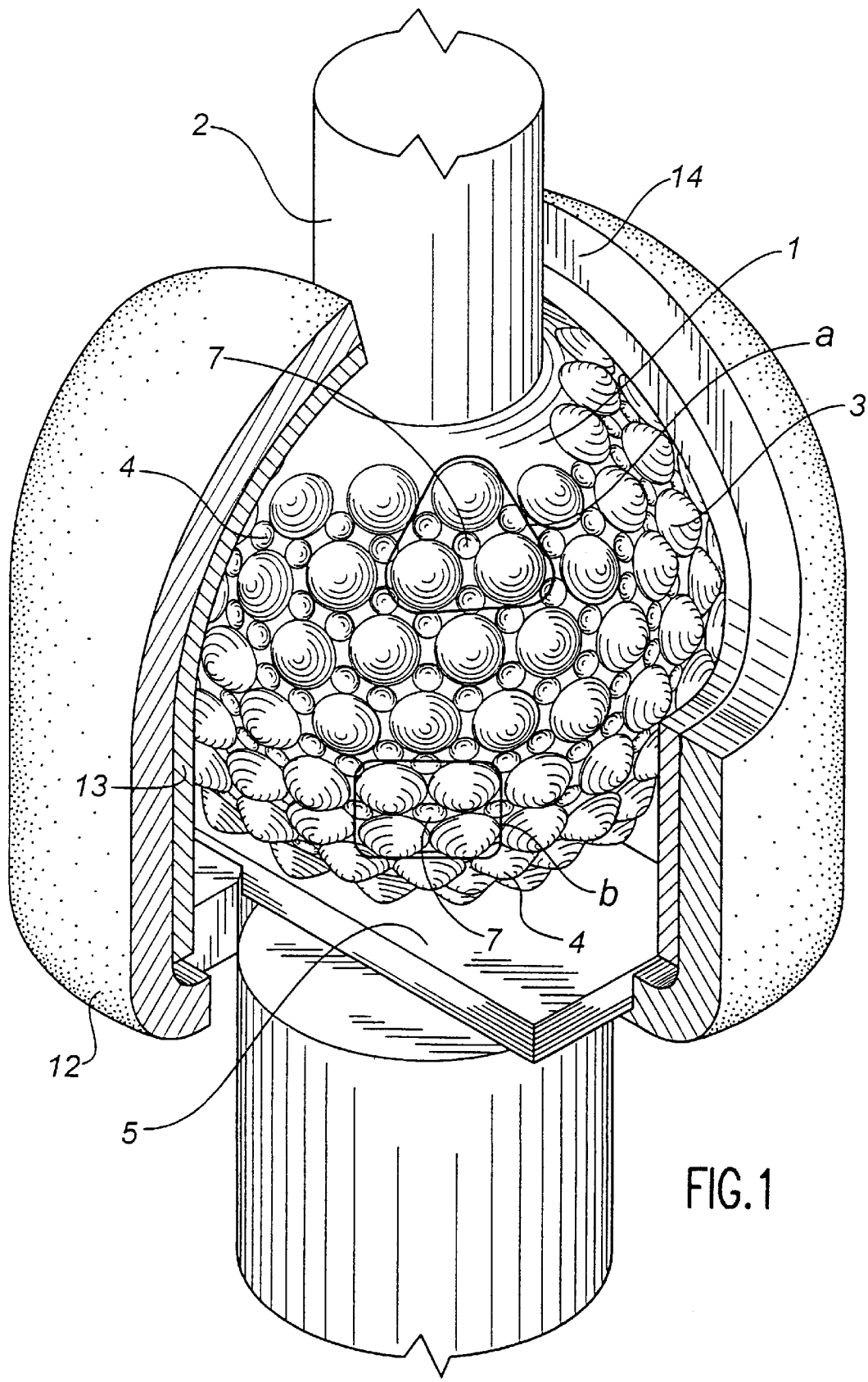
Figure 2:
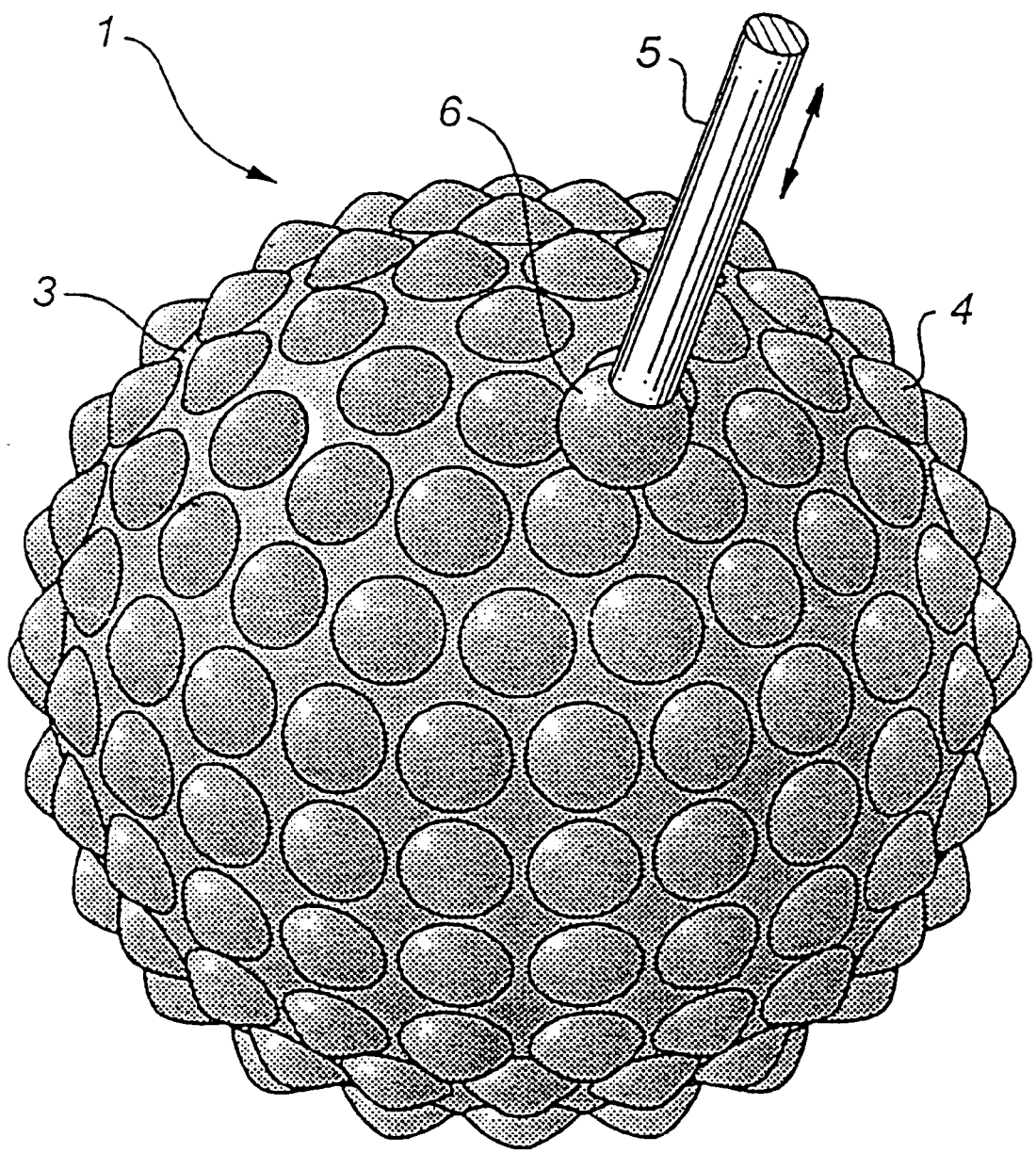
FIG. 2—a perspective view showing a ball and pin-type actuator in simplified form.
Figure 3:
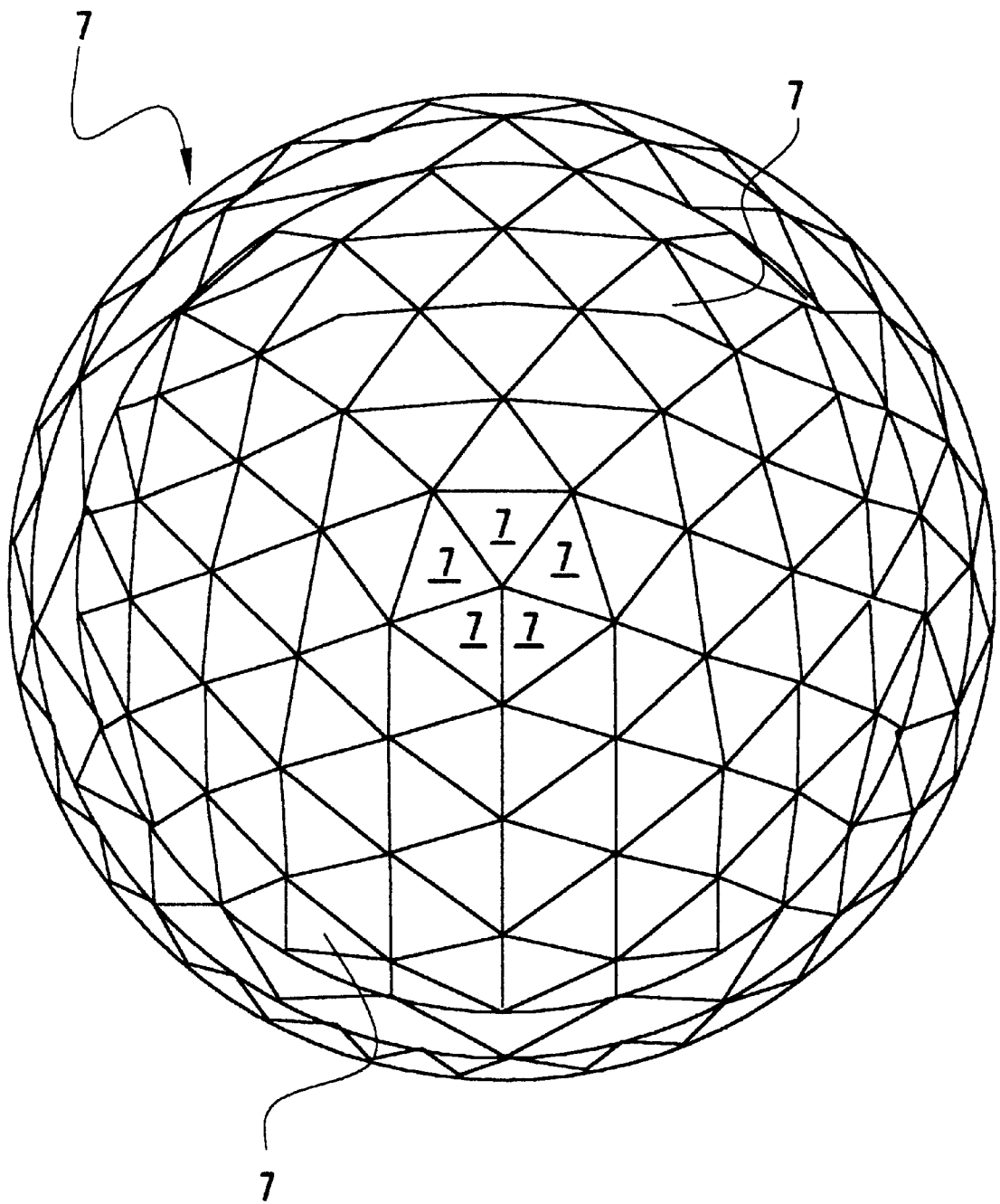
FIG. 3—a side view of a ball having its surface divided into triangles to establish a pattern of protuberances.
Figure 4:
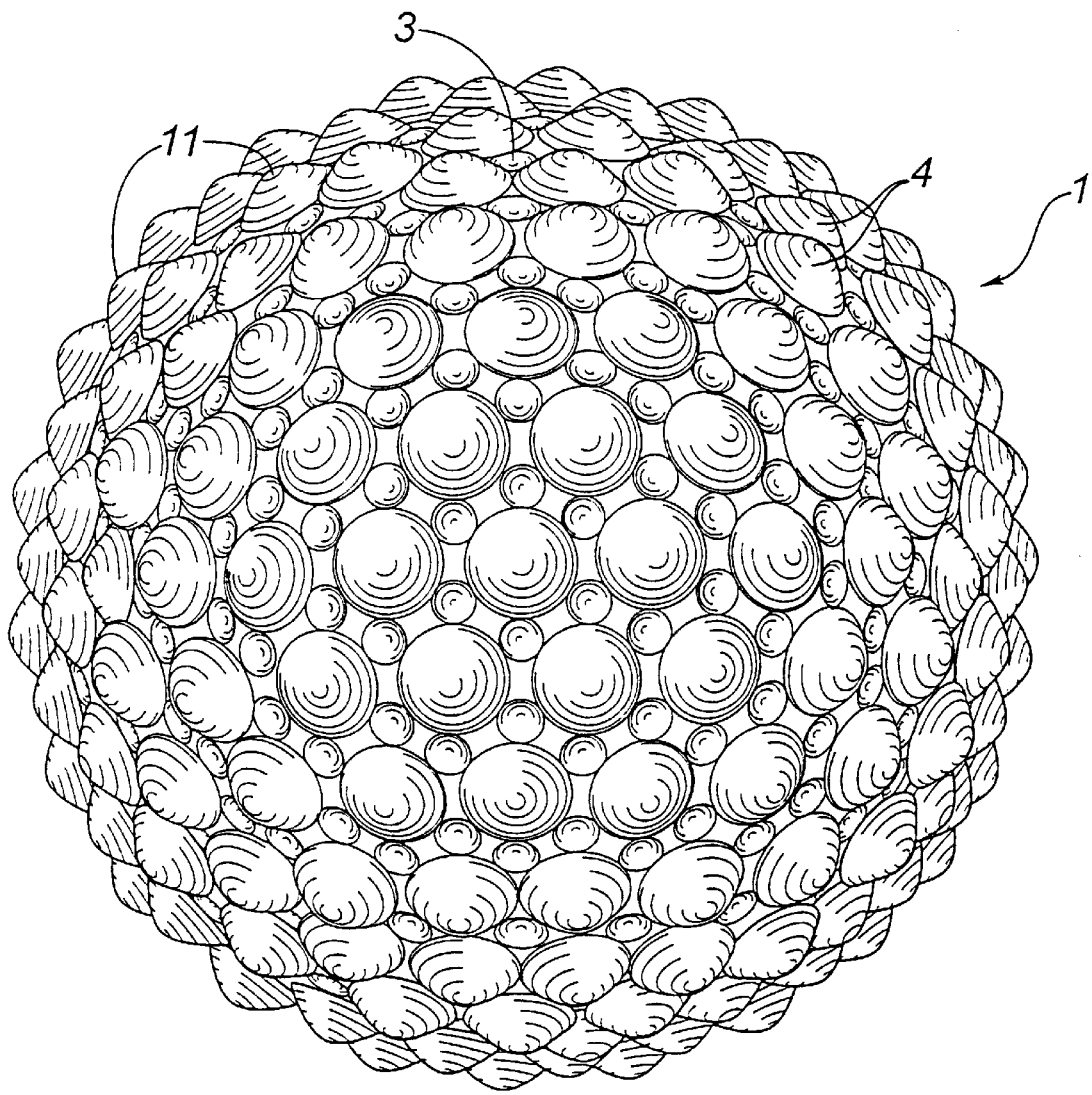
FIG. 4—a side view of the ball of FIG. 3, with protuberances positioned at the apiece of the triangles of FIG. 3.

With reference to FIG.1, the joint mechanism comprises a spherical member or ball 1 connected with a shank 2. The surface 3 of the ball 1 is formed with areas of triangular patterns a and square patterns b of protuberances 4. The spacing, area and size of the triangular patterns a is consistent, and the same is true of the square patterns b. The size and spacing of each protuberance 4 in each pattern is mainly consistent.

The joint mechanism further comprises an actuator 5 having a rounded or spherical tip 6 (FIG. 2 and FIGS. 5 to 7). The actuator 5 or its tip 6 can be advanced or retracted, for example by a bolt (not shown), to penetrate or withdraw from a concavity 7 defined by a pattern a, b of three or four protuberances 4.

Figure 5:
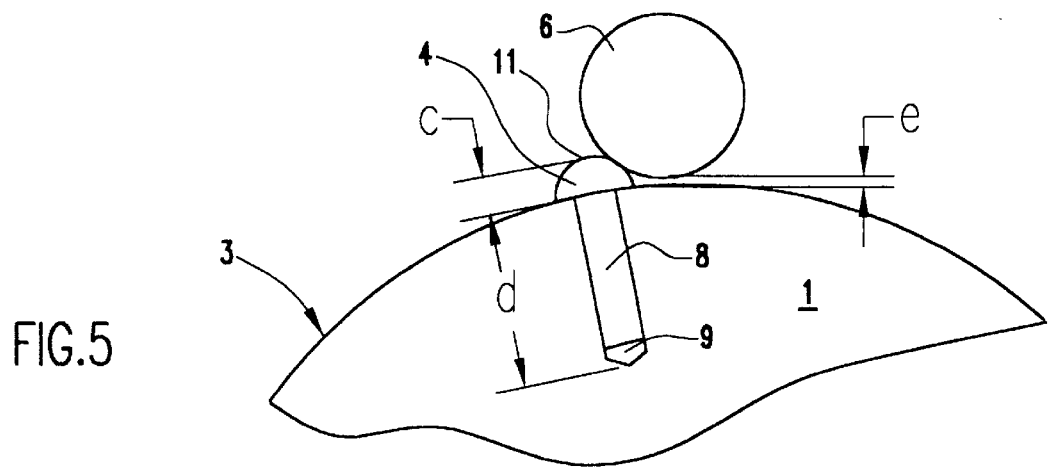
FIG. 5—a schematic cross-section showing a pin having its shank positioned in a radial bore formed in the ball with its head defining a protuberance in contact with a spherical actuator end having a minimum clearance from the surface of the ball.
Figure 6:
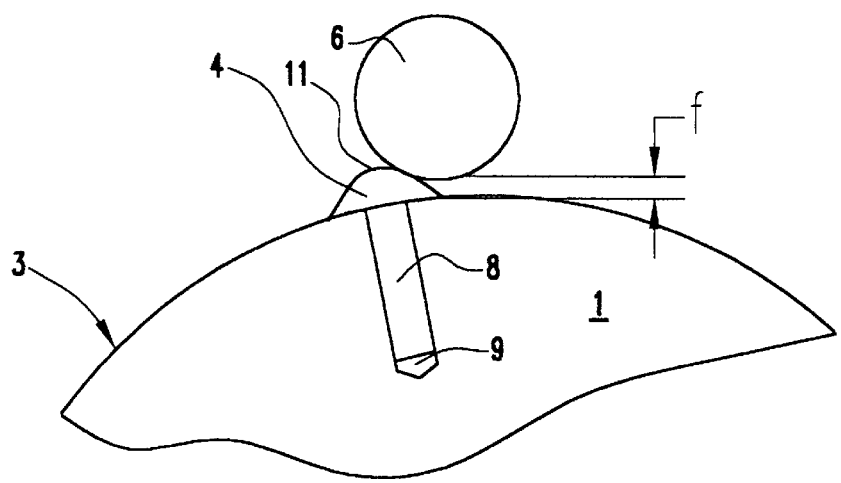
FIG. 6—a cross-section according to FIG. 5 showing a maximum distance between actuator end and ball surface.
Figure 7:
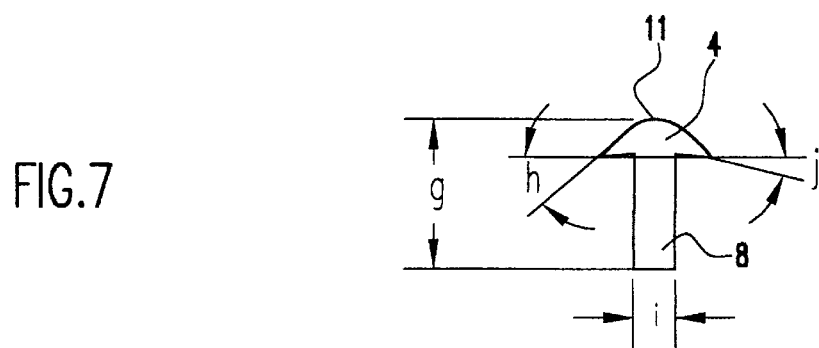
FIG. 7—a side view of the pin according to FIGS. 5 and 6.

According to FIGS. 5 to 7, the protuberances 4 could be defined by the heads of pins 8 received and retained in radial bores 9 formed in the ball 1.

To hold ball 1 and actuator 5 together and to allow these parts to change relative orientation when the actuator tip 6 is retracted, there is provided an outer shell 12 (FIG. 1) and an internal shell liner 13 formed of a resilient material. In the outer and inner shell 12, 13 there is an upper slot 14; the shank 2 of the ball 1 fits into the slot 14 which extends across the complete upper surface of said shells to thereby permit maximum rotation.

The protuberances 4, actuator tip 6 and patterns a, b being dimensioned so that the tip 6 can penetrate the concavity 7 of each pattern a, b and simultaneously contacts all of the protuberances 4 of the pattern that it penetrates but remains spaced from the surface 3 of the ball 1 at full penetration. Details are shown in FIGS. 5 and 6:

c=radial height of protuberance 4 defined by the pin head d=radial length of bore 9 e=minimum clear distance between tip 6 and ball surface 3 f=maximum clear distance between tip 6 and ball surface 3 g=length of pin 8 plus its head h=slope angle of protuberance 4 i=diameter of pin 8 j=angle between bottom of the pin head and ball surface 3.

A suitable set of dimensions for the components of FIGS. 5 to 7 is provided in Table 1, for recommended maximum and minimum pin separation for an overall pattern of 162 pins,

TABLE 1

| Ball ø: | 1.043" | (26.5 mm) |
| pin ø: | 0.142" | (3.6 mm) |
| actuator tip ø: | 2.250" | (6.4 mm) |
| Dimensions: | c = 0.043" | (1.1 mm) |
| | d = 0.23" | (5.8 mm) |
| | e = 0.015" | (0.4 mm) |
| | f = 0.023" | (0.6 mm) |
| | g = 0.236" | (6 mm) |
| | h = 43° | |
| | i = 0.063" | (1.6 mm) |
| | j = 6.0° | |

Figure 8:
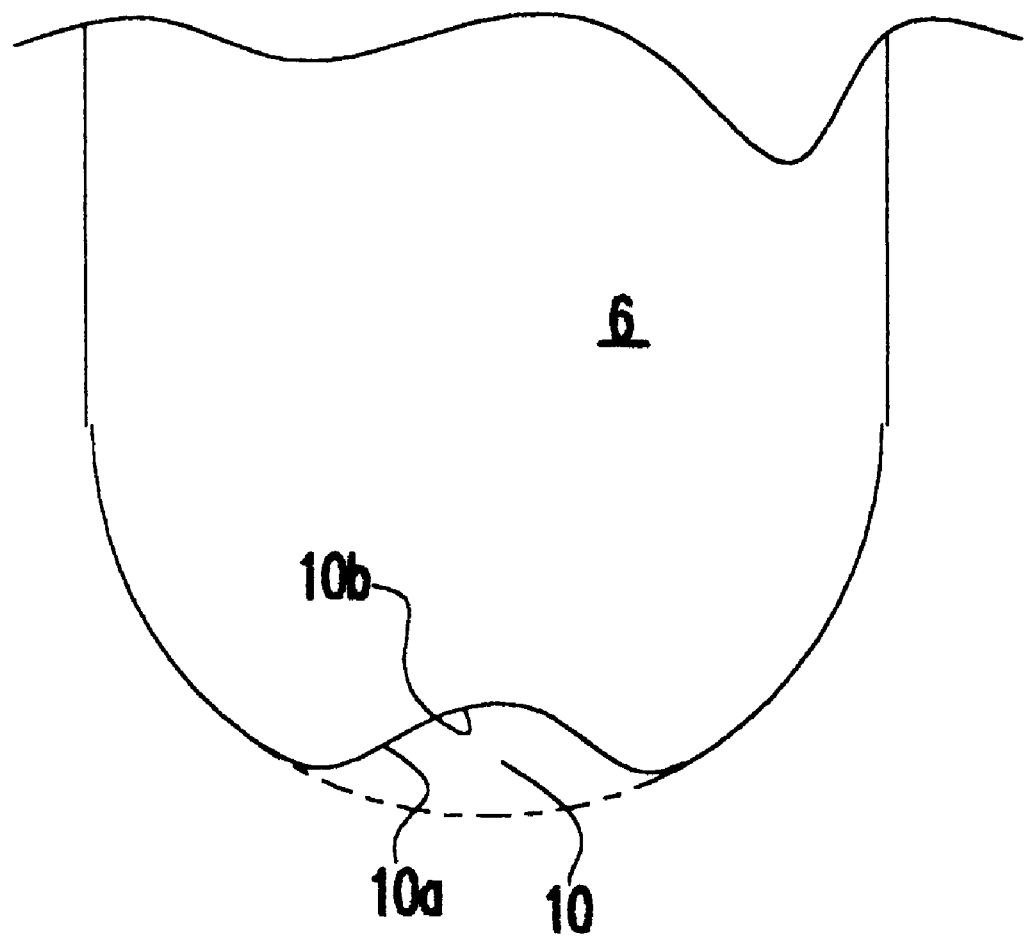
FIG. 8—a cross-section of the rounded tip of the actuator having a central indentation in its end.

In an optional feature of the invention, the spherical tip 6 of the actuator 5 is formed to provide an indentation 10 in its end (FIG. 8). The indentation 10 may be configured to closely conform to the peak 11 of each protuberance 4, so that if the tip 6 contacts a peak 11 straight on, the two parts will lock up. This adds as many locking positions as protuberances 4 are formed On the ball surface.

To create a firmer locking position it may be advantageous that said peak 11 contacts the lateral area 10a of the penetrated indentation 10 only, but remains spaced from the bottom 10b of the indentation 10 at full penetration.

While the invention has been described in terms of a single preferred embodiment, those skilled in the art will recognize that the invention can be practiced with modification within the spirit and scope of the appended claims.

What is claimed is:

1. An angularly adjustable releasably lockable joint mechanism for rigidly joining first and second parts at a selected orientation, said mechanism comprising:

a rounded member having a plurality of concavities on a surface of the rounded member and being secured to the first part;

a disengageable actuator having at least one tip and being operative to advance the tip to lock up with the rounded member by penetrating at least one concavity of the rounded member or to retract the tip to disengage it from the rounded member, said actuator being connected with the second part; and means for holding the parts, the rounded member and the actuator together, the means allowing the parts to change relative orientation when the actuator tip is retracted, wherein the rounded member includes a plurality of patterns of spaced apart protuberances covering at least part of its surface, the protuberances of each pattern forming a concavity therebetween, the patterns of each of spaced apart protuberances and the protuberances are substantially a same shape, area and size, and the patterns of spaced apart protuberance having a substantially polygonal configuration, the protuberances, the actuator tip and the patterns of the protuberances are dimensioned so that the tip penetrates the concavity of each pattern and simultaneously contacts the protuberances of the pattern that it penetrates at a locking site but remains spaced from a bottom of the concavity at full penetration, whereby the tip and the pattern of protuberances lock together, the rounded member further having depressions on the surface at the locking site which in conjunction with the protuberances form substantially a sine wave surface at the locking site.

2. The joint mechanism according to claim 1, wherein the rounded member is spherical.

3. The joint mechanism according to claim 1, wherein the substantial polygonal configuration of the patterns is one of triangular and square.

4. The joint mechanism according to claim 3, wherein the protuberances define a combination of square and triangular patterns on the rounded member.

5. The joint mechanism according to claim 1, wherein the tip of the actuator has a centrally positioned indentation at its end, the indentation being configured and dimensioned to substantially match a peak of the protuberances so that the tip and protuberances lock together.

6. The joint mechanism according to claim 5, wherein the peak contacts a lateral area of the indentation that the peak penetrates but remains spaced from the bottom of the indentation at full penetration.

* * * * *